UNITED STATES PATENT OFFICE.

LELAND C. CATES, OF CHICAGO, ILLINOIS, ASSIGNOR TO SUNBEAM CHEMICAL COMPANY, OF CHICAGO, ILLINOIS, A CORPORATION OF ILLINOIS.

ALKALI-PROOF DYE AND METHOD OF PRODUCING THE SAME.

1,349,265. Specification of Letters Patent. Patented Aug. 10, 1920.

No Drawing. Application filed July 27, 1918. Serial No. 246,988.

*To all whom it may concern:*

Be it known that I, LELAND C. CATES, a citizen of the United States, and resident of Chicago, in the county of Cook and State of Illinois, have discovered a new and useful Alkali-Proof Dye and Method of Producing the Same, of which the following is a specification.

My invention relates to dyes and particularly to a novel process for treating certain dyes and to render the same alkali proof.

The use of many dyes produced in the United States at the present time is limited because of the fact that such dyes are not alkali proof. They cannot be employed in many commercial lines and no practical method is known to the trade whereby such dyes may be transformed and made of value for general use. Recognizing this short-coming and desiring to increase the field of usefulness of American dyes, I have devised a method whereby many of the dyes, the usefulness of which has heretofore been limited, may be transformed into a valuable commercial product at a very low cost.

Not only are the dyes alkali proof and capable of being used for dyeing fabrics, etc., but the dye produced in accordance with my method is stable in form, even more stable than in its original condition.

I am able to say from experiments and practice that the following dyes may be treated in the manner hereinafter described in order to transform the same and render them alkali proof. The names given are in many instances the trade names because I have not at this time been able to ascertain the technical names or the structural formula of the dyes.

Tartrazum
Pheno-black, S. G. N.
Blue R.
Azo rubin S.
Scarlet 2 R. B.
Methyl violet
Old orange
Bismarck brown T. D.
Auramin
Congo red
Acid black 10 B. N.
Acid brown 0 1530

Green M.
Scarlet W.
Naphthol green B.
Acid yellow H. M.
Crystal violet 6 B. N.
Scarlet 4 R. N.
Fast acid red marden
Resorcin brown
Poncean 2 B.
Bordeaux B. N.
Anilin red
Nigrosin T.

In the treating of dyes and rendering the same alkali proof, I prefer to proceed in accordance with the following method. I dissolve substantially ten pounds of one of the above mentioned dyes in approximately thirty pints, one quarter normal (1%) caustic alkali, that is, a very weak sodium hydroxid or similar caustic solution. This mixture is heated preferably being brought to a boil, whereupon I add to the mixture approximately twenty gallons of a suitable vegetable oil. If desired I may dilute the vegetable oil with as high as 20% of an oleaginous mineral substance such as vaseline of a good quality. The dyes, caustic alkali and oil, are combined in a mixer, agitated, saponification continuing until the caustic is exhausted. I then add a quantity of 40 degree Baumé caustic soda solution, which quantity may be seven gallons more or less, sufficient to saponify the unsaponified oil in the compound. The amount of caustic thus added will vary and can be determined in each instance only by computation or experiment. It will vary with different dyes, some of which require more and some less alkali. It will also vary with the quantity and character of the oils.

After saponification of the final compound is complete, all of which is permitted to take place without the addition of further heat, the mixture is allowed to harden and after substantially complete drying and hardening, it is crushed and comminuted. In this condition it is stable and may be employed in the same manner as the imported alkali proof dyes, the production of which was thought possible only in Germany.

The proportions mentioned are illustrative only and may be varied within rather wide limits as experiments will prove. Therefore the proportions mentioned in the appended claims should be considered as illustrations and suggestions and not as specific limitations.

I claim:

1. The method of treating dyes, which consists in dissolving the dye in a weak solution of alkali, then applying heat, then adding the mixture to oil and permitting saponification to continue until the alkali is substantially exhausted, then adding substantially the exact quantity of alkali required to saponify any unsaponified oil, then permitting the compound to harden, then comminuting the same, substantially as described.

2. The method of treating dyes, which consists in dissolving the dye in a solution of substantially one-quarter normal alkali, then applying heat, then adding the mixture to oil and permitting saponification to continue until the alkali is substantially exhausted, then adding substantially the exact quantity of alkali required to saponify any unsaponified oil, then permitting the compound to harden, then comminuting the same, substantially as described.

3. The method of producing alkali proof dyes, which consists in dissolving a non-alkali proof dye in a substantially one-quarter normal solution of sodium hydroxid, bringing the solution to substantially the boiling point, then adding an excess of a saponifiable oil, permitting the subsequent reaction to continue until the alkali is substantially exhausted, then adding alkali in the proper quantity to saponify the excess oil, then permitting the substance to harden, then powdering the same, substantially as described.

4. The method of treating dies, which consists in dissolving substantially ten pounds of a non-alkali proof dye in substantially thirty pints of approximately 1% solution sodium-hydroxid, then applying heat, then adding substantially twenty gallons of an oil, then agitating and permitting saponification to continue until the alkali is exhausted, then adding such quantity of alkali as will saponify the excess oil, then permitting the compound to harden, then powdering the same.

5. An alkali proof dye in comminuted form, composed of the reaction products of a non-alkali proof dye, a weak, alkali solution, and a saponified oil, substantially as described.

6. An alkali proof dye in comminuted form, composed of the reaction products of a non-alkali proof dye, a weak, alkali solution, and a saponified oil, the dye first being treated in an excess of oil and the excess of oil being later saponified, substantially as described.

Signed at Chicago, in the county of Cook and State of Illinois, this 22 day of July, 1918.

LELAND C. CATES.

Witness:
 A. H. DRESSEL.